United States Patent [19]
Vogelpohl et al.

[11] Patent Number: 4,954,257
[45] Date of Patent: Sep. 4, 1990

[54] BIOLOGICAL PURIFICATION LOOP DEVICE AND METHOD HAVING DEFLECTOR PLATE WITHIN GUIDE PIPE

[75] Inventors: Alfons Vogelpohl, Clausthal-Zellerfeld; Norbert Rabiger, Meisenweg, both of Fed. Rep. of Germany

[73] Assignee: Tecon GmbH, Clausthal-Zellerfeld, Fed. Rep. of Germany

[21] Appl. No.: 313,849

[22] Filed: Feb. 23, 1989

[51] Int. Cl.$^5$ .............................................. C02F 3/02
[52] U.S. Cl. ..................................... 210/607; 210/617;
210/622; 210/623; 210/629; 210/151;
210/195.3; 210/197
[58] Field of Search ............... 210/607, 615, 622, 623,
210/629, 616, 617, 150, 151, 195.3, 197

[56] References Cited

U.S. PATENT DOCUMENTS

| | | | |
|---|---|---|---|
| Re. 27,721 | 8/1973 | Klock | 210/622 |
| 3,371,033 | 2/1968 | Simmons et al. | 210/615 |
| 3,878,097 | 4/1975 | Machizuki et al. | 219/151 |
| 3,910,838 | 10/1975 | Kaelin | 210/629 |
| 3,923,656 | 12/1975 | Krebs et al. | 210/151 |
| 4,100,071 | 7/1978 | Beurer et al. | 210/220 |
| 4,207,180 | 6/1980 | Chang | 210/629 |
| 4,263,143 | 4/1981 | Ebner et al. | 210/629 |
| 4,411,780 | 10/1983 | Suzuki et al. | 210/615 |
| 4,425,231 | 1/1984 | Fujimoto et al. | 210/629 |
| 4,451,372 | 5/1984 | Rovira | 210/603 |
| 4,629,565 | 12/1986 | Hell et al. | 210/629 |
| 4,818,404 | 4/1989 | McDowell | 210/629 |

FOREIGN PATENT DOCUMENTS

| | | |
|---|---|---|
| 0003547 | 6/1979 | European Pat. Off. |
| 0010571 | 5/1980 | European Pat. Off. |
| 0130499 | 1/1985 | European Pat. Off. |
| 1557018 | 3/1970 | Fed. Rep. of Germany |
| 7530874 | 10/1975 | France |
| 0055393 | 3/1984 | Japan ................................. 210/622 |
| 0812759 | 3/1981 | U.S.S.R. ............................. 210/622 |

*Primary Examiner*—Richard V. Fisher
*Assistant Examiner*—Cynthia L. Messler
*Attorney, Agent, or Firm*—Wegner & Bretschneider

[57] ABSTRACT

The present invention relates to a reactor for biological purification of pollutant-containing water in a closed vessel by means of loop operation. This vessel contains, disposed vertically and concentrically with respect to its jacket and to each other, an insertable pipe that is open at both ends, into which a nozzle projects for the purpose of supplying the water-gas-biomass mixture to be purified, and a guide pipe that is open at both ends and that forms an inner annulus with the internal insertable pipe and an outer annulus with the reactor jacket. This guide pipe projects above and below the ends of the insertable pipe. A deflector plate is mounted below the insertable pipe but inside the guide pipe, so that part of the biomass-water mixture is deflected back into the inner annulus. A conically shaped sedimentation chamber is disposed in the lower part of the reactor.

19 Claims, 1 Drawing Sheet

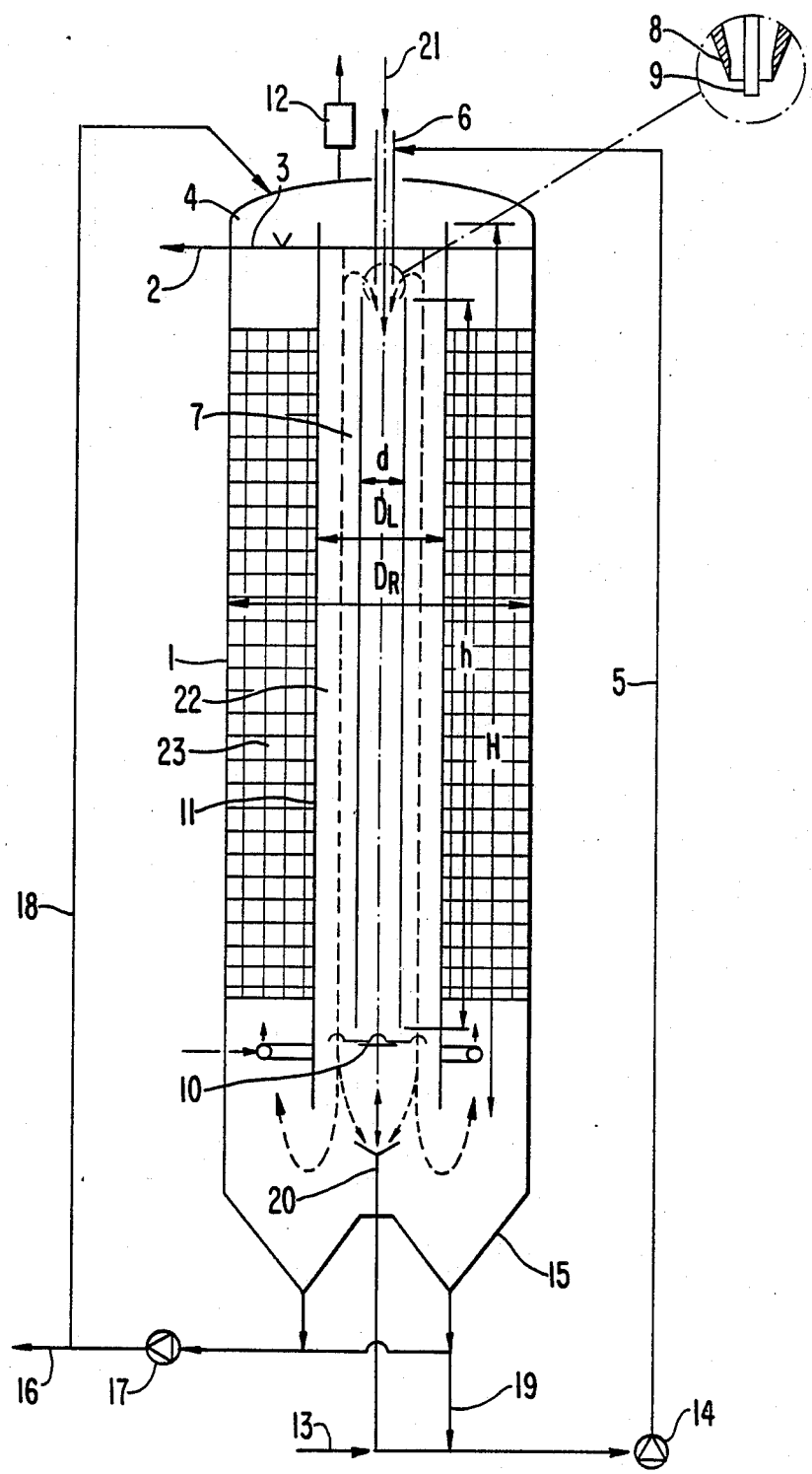

BIOLOGICAL PURIFICATION LOOP DEVICE AND METHOD HAVING DEFLECTOR PLATE WITHIN GUIDE PIPE

The subject matter of the invention is a reactor for biological purification of pollutant-containing water in a closed vessel by means of loop operation as well as a process for carrying out the water purification.

A large number of biological processes are known for the removal of pollutants from waste waters, which processes are described in detail in the relevant literature (see, for example, Rehm H. J.: Industrielle Mikrobiologie [Industrial Microbiology], 2nd edition, Berlin-Heidelberg-New York 1981; Präve B.: Handbuch der Biotechnologie [Handbook of Biotechnology], Wiesbaden 1982; Einsele A.: Mikrobiologische und biochemische Verfahrenstechnik [Microbiological and Biochemical Process Engineering], Weinheim 1985; Fritsche W.: Umwelt-Mikrobiologie [Environmental Microbiology], Berlin 1985). In many cases such processes are carried out in shallow activated-sludge tanks and in sedimentation tank separated therefrom. The disadvantages of such processes are in particular the smell pollution, the noise pollution, the large space requirement and the high capital and operating costs.

It is also known how to purify waste water in high cylindrical towers or bubble columns. However, the space requirement for those installations is relatively large. Moreover the multistory construction requires large capital and operating costs.

West German Offenlegungsschrift* 3,108,629 describes a waste-water treatment plant in which, by means of a pump, the waste water is circulated in a vertical cylindrical external pipe containing an internal flow-conducting pipe. In this case the pumped-off waste water is fed from above to the internal flow-conducting pipe, which projects beyond the liquid level of the upflow chamber. In addition, oxygen-containing gas is injected by a blower into the flow-conducting pipe. To increase the capability of the waste water to dissolve oxygen, both the external and internal pipes forming the circulation chambers ought to extend to a depth of 100 m. This number makes it clear what dimensions such an installation has. Because the installation is of open construction, smell pollution is not to be excluded.

*Translator's note: A German patent application laid open to public inspection as received, before examination and acceptance by the German Patent Office.

European Patent A 0,003,547 relates to a closed reactor for biological purification that has an internal flow pipe into which waste water and air are introduced by means of a nozzle. Furthermore, French Pat. No. A 2,326,384 discloses how to aerate waste water and discharge it into an open tank by means of a driving-jet nozzle. German Pat. No. A 1,557,018 also describes how to use driving-jet nozzles in reactors for mixing gases and liquids. European Pat. No. A 0,130,499 discloses an apparatus for biological waste-water purification. This is a closed reactor vessel that contains an internal flow-conducting pipe disposed vertically and concentrically with respect to its external jacket. The waste water and an oxygen-containing gas are fed to the flow-conducting pipe through a two-fluid nozzle. If the waste water is particularly badly polluted and the purification therefore insufficient, the waste water is also fed to a second reactor and therein treated in a second stage. In such a double installation, the gas accumulating overhead in the reactor casing can also become remixed with the waste water.

The use of the said loop-type reactors indeed has considerable advantages. However, a large power input is needed to maintain the loop flow, and so the specific energy consumption of such processes is relatively high. A further disadvantage of these processes is that part of the biomass transported with the purified water from the activated-sludge chamber must be returned to the activated-sludge chamber in order to prevent washing out of the biomass from the activated-sludge chamber. Thus devices for separating the biomass from the purified waste water are necessary.

The object of the present invention is therefore to provide a reactor for purification of pollutant-containing water in which activated-sludge chamber and sedimentation chamber are combined in one apparatus and consequently the above-mentioned disadvantages of multistage installations are avoided.

The object is achieved by a reactor constructed as a closed vessel in which there are disposed, vertically and concentrically with respect to its jacket and to each other, (a) an insertable pipe that is open at both ends, into which a nozzle projects for the purpose of feeding the biomass-water-gas mixture to be purified, and (b) a guide pipe having imperforate walls that is open at both ends, that forms an inner annulus with the internal insertable pipe and an outer annulus with the vessel jacket 4 and that also projects above and below the ends of the insertable pipe, (c) a deflector plate below the insertable pipe but inside the guide pipe, so that the biomass-water-gas mixture is partly deflected into the inner annulus, and (d) at least one conically shaped sedimentation chamber in the lower part of the reactor.

The sedimentation chamber can be provided with clearing devices for removal of the biomass. Suction-type clearing devices, for example, can be considered for this purpose. A two-fluid nozzle, through the nozzle outlet cross section of which an insertable pipe supplied with oxygen is guided, can be used as the nozzle. Such a nozzle is described, for example, in European Pat. No. 0,130,499. The inner and the outer annulus can be provided with internals for the purpose of immobilizing microorganisms. Packing materials can also be used as support material for the microorganisms.

Another object of the invention is to provide a process for waste-water purification that can be carried out by means of the reactor according to the invention.

This object is achieved by providing that (a) a biomass-water-gas mixture is charged into the insertable pipe of the reactor by means of a two-fluid nozzle and (b) at the deflector plate it is deflected toward the inner annulus, so that part of the mixture flows upward while the other part flows downward through a suction pipe and arrives in the outer annulus, (c) the mixture emerging at the upper end of the inner annulus is mixed with the freshly incoming water-gas-biomass mixture by the driving-jet action of the two-fluid nozzle and is charged into the insertable pipe, (d) the water flowing upward in the outer annulus is subjected to a posttreatment reaction and (e) is removed as purified water from the reactor through an outlet pipe.

The principle of the process according to the invention is based on the introduction of water into a reactor by aerating a biomass-water mixture. In this way water and gas are continuously supplied to the activated-sludge chamber. Simultaneously, a biomass-water mixture is continuously extracted from the sedimentation chamber and returned to the activated-sludge chamber. At the same time, the purified water and the excess biomass are continuously removed.

The invention is explained in more detail in the following by reference to the FIGURE, which shows a schematic construction of an installation for carrying out the process according to the invention in an exemplary design.

The water to be purified is passed through the line 13, combined with the recycled biomass-water mixture and passed through the return pump 14 and the return line 5, and then by means of a two-fluid nozzle 6 is fed concentrically from above into the insertable pipe 7. In the process, gas is additionally sucked or supplied under pressure from a gas-containing chamber 21 through the gas suction pipe 9, which is disposed centrally in the nozzle outlet cross section 8. Because of the conveying effect of the driving jet of the two-fluid nozzle, the gas-biomass-water mixture passes downward into the insertable pipe and at the deflector plate 10 is deflected toward the guide pipe 11 into the inner annulus 22, so that part of the mixture flows upward in this annulus between insertable pipe and guide pipe. Therein part of the entrained gas is released through the filter 12. The rest of the mixture flows back downward and is supplied through the suction pipe 20 to the two-fluid nozzle. Another part of the water flows back upward in the outer annulus 23 and exits the reactor as purified water through the outlet pipe 2. Posttreatment of the water, preferably nitrification, is carried out in the outer annulus. The posttreatment can be carried out by means of microorganisms fixed on a support. Fixed internals or packing materials can be considered as supports. By means of the pump discharge 17, the biomass settling in the lower, conically shaped sedimentation chamber 15 of the reactor is removed from the reactor through the discharge pipe 16. The biomass can also be recycled into the reactor through the recycle line 18. In another option, the biomass passing through the connecting line 19 is combined with the gas-water-biomass mixture flowing out of the reactor through the suction pipe 20 and, by means of the return pump 14, is recycled into the reactor through the two-fluid nozzle 6. The waste water flowing to the reactor can be mixed with purified water before entering the reactor. The incoming waste water can also be mixed on the suction side of the return pump (14) with the volume flow conveyed in the loop and sucked off through the suction pipe (20).

Atmospheric air, oxygen-enriched air or pure oxygen can be used as the gas.

By means of the process according to the invention, it is possible to purify in particular waste waters, pollutant-containing ground water and industrial waste water.

We claim:

1. A reactor for biological purification of pollutant-containing water in a closed vessel, wherein said purification is carried out by means of loop operation, said reactor comprising:
   (a) an insertable pipe located centrally and vertically within said vessel, such that said pipe is open at both ends, with the entrance end having a nozzle project therein such that a biomass-water-gas mixture to be purified may be fed into said pipe,
   (b) a guide pipe having imperforate walls located concentrically around said insertable pipe within said vessel, such that said pipe is open at both ends and such that an inner annulus is formed between said insertable pipe and said guide pipe and an outer annulus is formed between said guide pipe and said vessel, said guide pipe projecting above and below the ends of said insertable pipe,
   (c) a deflector plate located below the exit end of said insertable pipe and within said guide pipe, such that said biomass-water-gas mixture is partly deflected into said inner annulus, and
   (d) at least one conically shaped sedimentation chamber located in the lower part of the reactor, such that said chamber is below the exit ends of said guide and said insertable pipes.

2. A reactor according to claim 1, wherein said nozzle is a two-fluid nozzle, through which an inner concentric pipe is guided, such that said inner concentric pipe is supplied with air or oxygen.

3. A reactor according to claim 1, wherein said sedimentation chamber is equipped with clearing devices for removal of the biomass.

4. A reactor according to claim 3, wherein said clearing devices are suction-type clearing devices.

5. A reactor according to claim 1, wherein said outer or inner annulus is equipped with internals for the purpose of immobilization of microorganisms.

6. A reactor according to claim 5, wherein said internals comprise packing materials.

7. A reactor according to claim 1, wherein said outer and inner annulus is equipped with internals for the purpose of immobilization of microorganisms.

8. A reactor according to claim 7, wherein said internals comprise packing materials.

9. A process for biological purification of pollutant-containing water in a reactor, such that said reactor is a closed vessel, and said purification is carried out by means of loop operation, said reactor comprising:
   (a) an insertable pipe located centrally and vertically within said vessel, such that said pipe is open at both ends, with the entrance end having a two-fluid nozzle project therein such that a biomass-water-gas mixture to be purified may be fed into said pipe,
   (b) a guide pipe having imperforate walls located concentrically around said insertable pipe within said vessel, such that said pipe is open at both ends and such that an inner annulus is formed between said insertable pipe and said guide pipe and an outer annulus is formed between said guide pipe and said vessel, said guide pipe projecting above and below the ends of said insertable pipe,
   (c) a deflector plate located below the exit end of said insertable pipe and within said guide pipe, such that said biomass-water-gas mixture is partly deflected into said inner annulus, and
   (d) at least one conically shaped sedimentation chamber located in the lower part of the reactor, such that said chamber is below the exit ends of said guide and said insertable pipes, wherein said process comprises the steps of
      (i) a biomass-water-gas mixture is fed into the insertable pipe of the reactor by means of the two-fluid nozzle;
      (ii) said mixture is deflected toward the inner annulus by means of the deflector plate, such that part of the mixture flows upward into the inner annulus, part flows downward through a suction pipe, and part flows into the outer annulus;

(iii) the part of the mixture emerging at the upper end of the inner annulus is mixed with freshly incoming water-gas-biomass mixture by a driving-jet action of the two-fluid nozzle and is fed into the insertable pipe;

(iv) the part of the mixture flowing upward in the outer annulus is subjected to a posttreatment reaction; and (v) said water from the biomass-water-gas mixture is removed as purified water from the reactor through an outlet pipe.

10. A process according to claim 9, further comprising the step wherein biomass settling in a sedimentation chamber passes through a connecting line, is combined with the biomass-water-gas mixture flowing out of the reactor through the suction pipe and, by means of a return pump, is recycled to the two-fluid nozzle.

11. A process according to claim 9, further comprising the step wherein waste water flowing to the reactor is mixed with purified water before entering the reactor.

12. A process according to claim 9, characterized in that nitrification treatment is carried out in the outer annulus.

13. A process according to claim 9, wherein the biomass-water-gas mixture flowing out through the suction pipe is recycled into the reactor through the two-fluid nozzle by means of a return pump.

14. A process according to claim 13, wherein incoming waste water is mixed on the suction side of the return pump with the biomass-water-gas mixture flowing out of the reactor through the suction pipe.

15. A process according to claim 9, further comprising the step wherein biomass settling in a sedimentation chamber is removed through a discharge pipe by means of a discharge pump.

16. A process according to claim 15, wherein the biomass is recycled into the reactor through a separate recycle line by means of said discharge pump.

17. A process according to claim 9, wherein the posttreatment in the outer annulus is carried out by means of microorganisms fixed on a support therein.

18. A process according to claim 17, wherein said support is comprised of fixed internals.

19. A process according to claim 17, wherein said support is comprised of packing materials.

* * * * *

UNITED STATES PATENT AND TRADEMARK OFFICE
CERTIFICATE OF CORRECTION

PATENT NO. : 4,954,257

DATED : September 4, 1990

INVENTOR(S) : Alfons VOGELPOHL et al.

It is certified that error appears in the above-identified patent and that said Letters Patent is hereby corrected as shown below:

Column 4, line 4, change "inn®r" to --inner--.

Signed and Sealed this

Twenty-eighth Day of April, 1992

Attest:

HARRY F. MANBECK, JR.

Attesting Officer     Commissioner of Patents and Trademarks